United States Patent
Haendler

(10) Patent No.: US 12,539,483 B2
(45) Date of Patent: Feb. 3, 2026

(54) AIR FILTER WITH INTEGRATED L-SHAPED PRESSURE PROBE

(71) Applicant: Carl Freudenberg KG, Weinheim (DE)

(72) Inventor: Volker Haendler, Hopkinsville, KY (US)

(73) Assignee: Carl Freudenberg KG, Weinheim (DE)

( * ) Notice: Subject to any disclaimer, the term of this patent is extended or adjusted under 35 U.S.C. 154(b) by 323 days.

(21) Appl. No.: 18/359,022

(22) Filed: Jul. 26, 2023

(65) Prior Publication Data
US 2025/0032969 A1   Jan. 30, 2025

(51) Int. Cl.
*B01D 46/00* (2022.01)
*B01D 46/44* (2006.01)
*B01D 46/52* (2006.01)

(52) U.S. Cl.
CPC ..... *B01D 46/0086* (2013.01); *B01D 46/0002* (2013.01); *B01D 46/446* (2013.01); *B01D 46/521* (2013.01)

(58) Field of Classification Search
CPC .............. B01D 46/521; B01D 46/0086; B01D 46/0002; B01D 46/10; B01D 46/446
See application file for complete search history.

(56) References Cited

U.S. PATENT DOCUMENTS

| | | | |
|---|---|---|---|
| 6,837,922 B2* | 1/2005 | Gorin | B01D 46/0086 210/90 |
| 7,726,186 B2* | 6/2010 | Nair | H05K 7/20736 73/204.25 |
| 9,092,040 B2* | 7/2015 | Fadell | F24F 11/63 |
| 9,517,429 B2* | 12/2016 | Beier | B01D 46/0086 |
| 2007/0277592 A1* | 12/2007 | Johansson | B01D 46/10 73/38 |
| 2021/0023494 A1* | 1/2021 | Oelsner | B01D 46/10 |
| 2023/0201751 A1* | 6/2023 | Mok | B01D 46/0086 55/495 |
| 2025/0090987 A1* | 3/2025 | Dodd | B01D 46/0005 |

FOREIGN PATENT DOCUMENTS

| | | | | |
|---|---|---|---|---|
| CA | 2371729 A1 * | 8/2003 | | |
| DE | 10 2017 210270 A1 | 12/2018 | | |
| EP | 3865199 A1 | 8/2021 | | |
| EP | 3885022 A1 * | 9/2021 | ......... | B01D 46/0086 |
| SE | 2051532 A1 | 6/2022 | | |
| WO | 2022136515 A1 | 6/2022 | | |

OTHER PUBLICATIONS

Extended European Search Report dated Oct. 10, 2024 (corresponding to EP 24184337.4).

* cited by examiner

*Primary Examiner* — Nathan C Zollinger
(74) *Attorney, Agent, or Firm* — Daniel J. Sepanik, Esq.; Harness, Dickey & Pierce, P.L.C.

(57) ABSTRACT

An air filter is provided with a built-in air pressure sensor that enables pressure drop measurement of the filter when installed. The air filter includes a frame structure and a filter media disposed in the frame structure and forming a plurality of V-banks or pockets. A static pressure tip mounted to extend upstream within one of the plurality of V-banks or pockets.

7 Claims, 4 Drawing Sheets

AIR FILTER WITH INTEGRATED L-SHAPED PRESSURE PROBE

FIELD

The present disclosure relates to an air filter with integrated pressure sensor.

BACKGROUND

This section provides background information related to the present disclosure which is not necessarily prior art.

Filtration systems are commonly used in many environments to ensure clean air is supplied to a desired machine or environment. It is desirable in the art to provide a system that is capable of identifying when the filter is full of debris and is in need of being changed or cleaned.

SUMMARY

This section provides a general summary of the disclosure, and is not a comprehensive disclosure of its full scope or all of its features.

The present disclosure provides an air filter with a built-in air pressure sensor that enables pressure drop measurement of a filter when installed. According to an aspect of the present disclosure, an air filter includes a frame structure and a filter media disposed in the frame structure and forming a plurality of V-banks or pockets. A static pressure tip mounted to extend upstream within one of the plurality of V-banks or pockets.

According to another aspect, the static pressure tip includes an L-shaped probe having at least one side aperture in communication with a center bore.

According to another aspect, a pressure sensor is connected to the L-shaped probe via an elongated tube.

According to another aspect, the L-shaped probe is mounted to the frame structure.

According to another aspect, the frame structure includes a plurality of cross bars disposed between the plurality of V-banks or pockets.

According to another aspect, the static pressure tip is mounted to one of the plurality of cross bars.

According to another aspect, the frame structure is made from plastic.

According to another aspect, the static pressure tip is mounted through an aperture in the frame structure.

According to an aspect of the present disclosure, an air filter includes a frame structure and a filter media disposed in the frame structure and forming a plurality of V-banks or pockets. An L-shaped probe is mounted to the frame structure to extend upstream within one of the plurality of V-banks or pockets and includes at least one side aperture in communication with a center bore, the L-shaped probe being connected to a pressure sensor via an elongated tube.

According to an aspect of the present disclosure, an air filter, includes a frame structure and a filter media disposed in the frame structure and forming a plurality of V-banks or pockets. An L-shaped probe is mounted to extend upstream within one of the plurality of V-banks or pockets, wherein the static pressure tip is mounted through an aperture in the frame structure.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
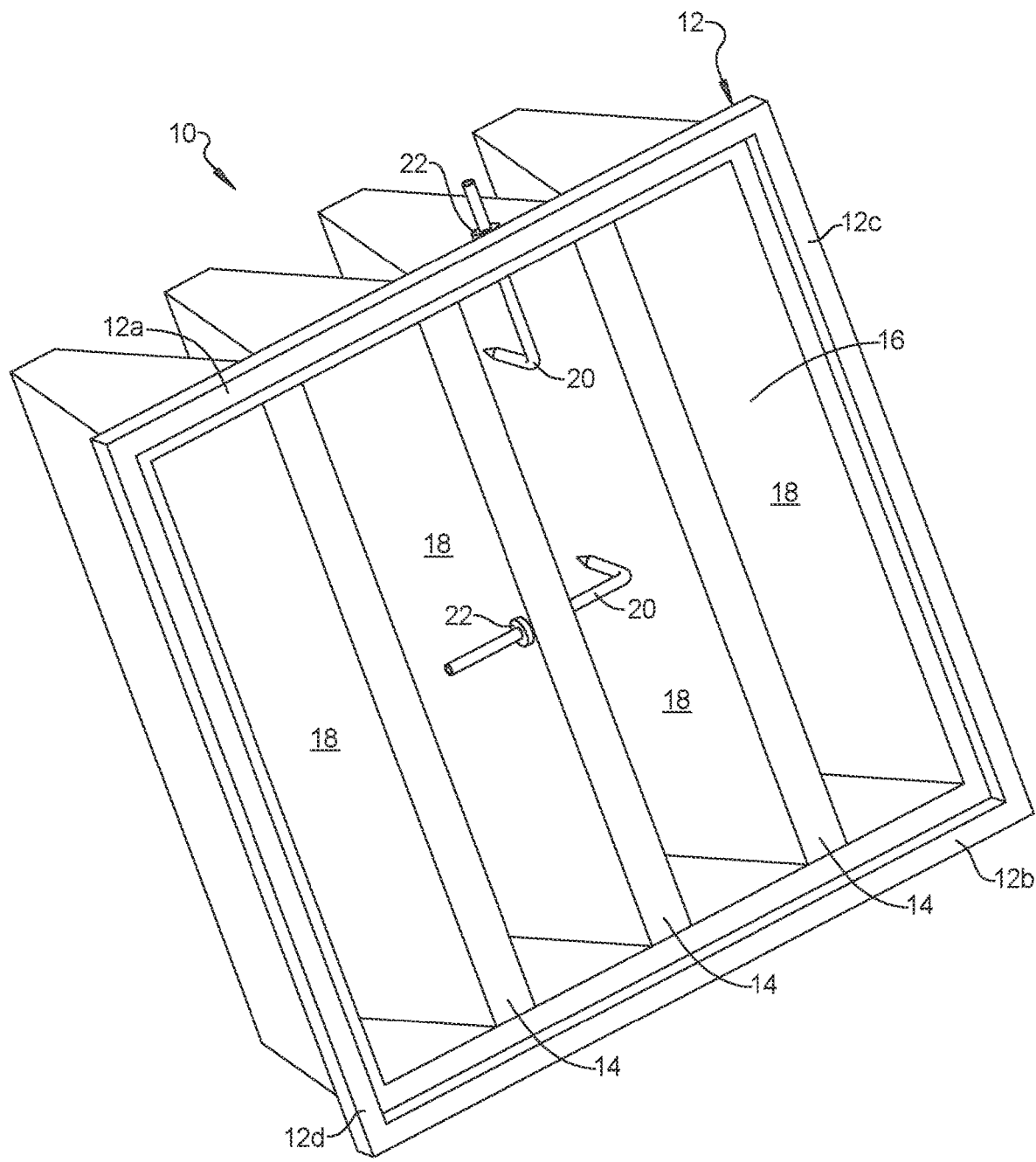
FIG. 1 is a perspective view of a filter assembly having a static pressure tip according to the principles of the present disclosure.

With reference to FIG. 1, a filter assembly 10 is shown including a frame structure 12 that includes an upper wall 12a, a lower wall 12b and a pair of sidewalls 12c, 12d. The frame structure can further include a plurality of cross bars 14 extending across a downstream face of the frame structure 12. The frame structure 12 can be made from plastic, metal or other rigid material.

A filter media 16 is attached to the frame structure 12 and defines a plurality of V-banks or pockets 18 (four of which are shown). For purposes of this disclosure, the term pockets is intended to include pockets of any shape including V-banks that are pockets having a V-shape. The filter media 16 is supported in the V-bank or pocket shape by the frame structure 12. The filter media 16 can be pleated and can be made from any known filter media.

Figure 2:
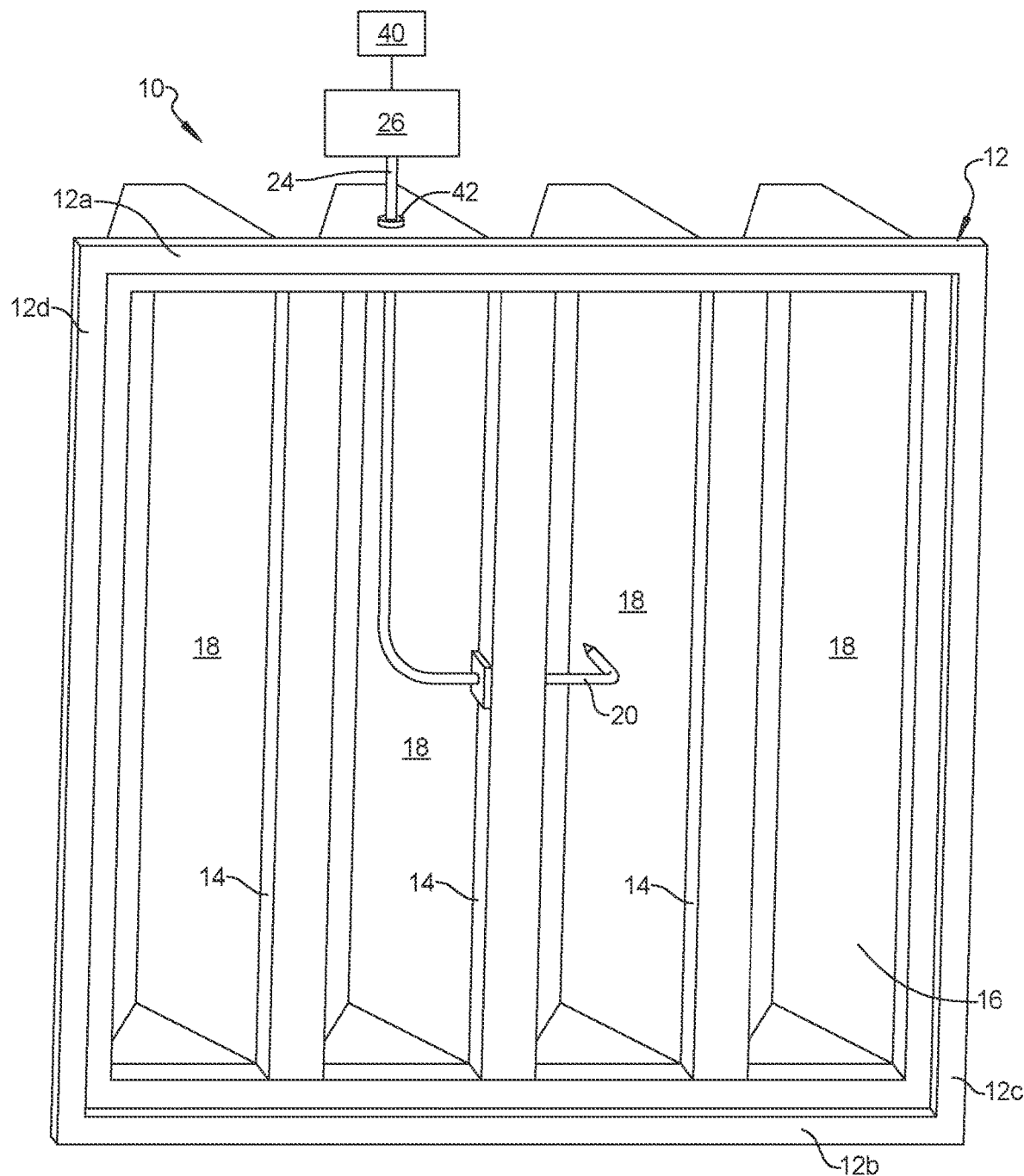
FIG. 2 is a front plan view of a filter assembly having a static pressure tip according to the principles of the present disclosure.
Figure 3:
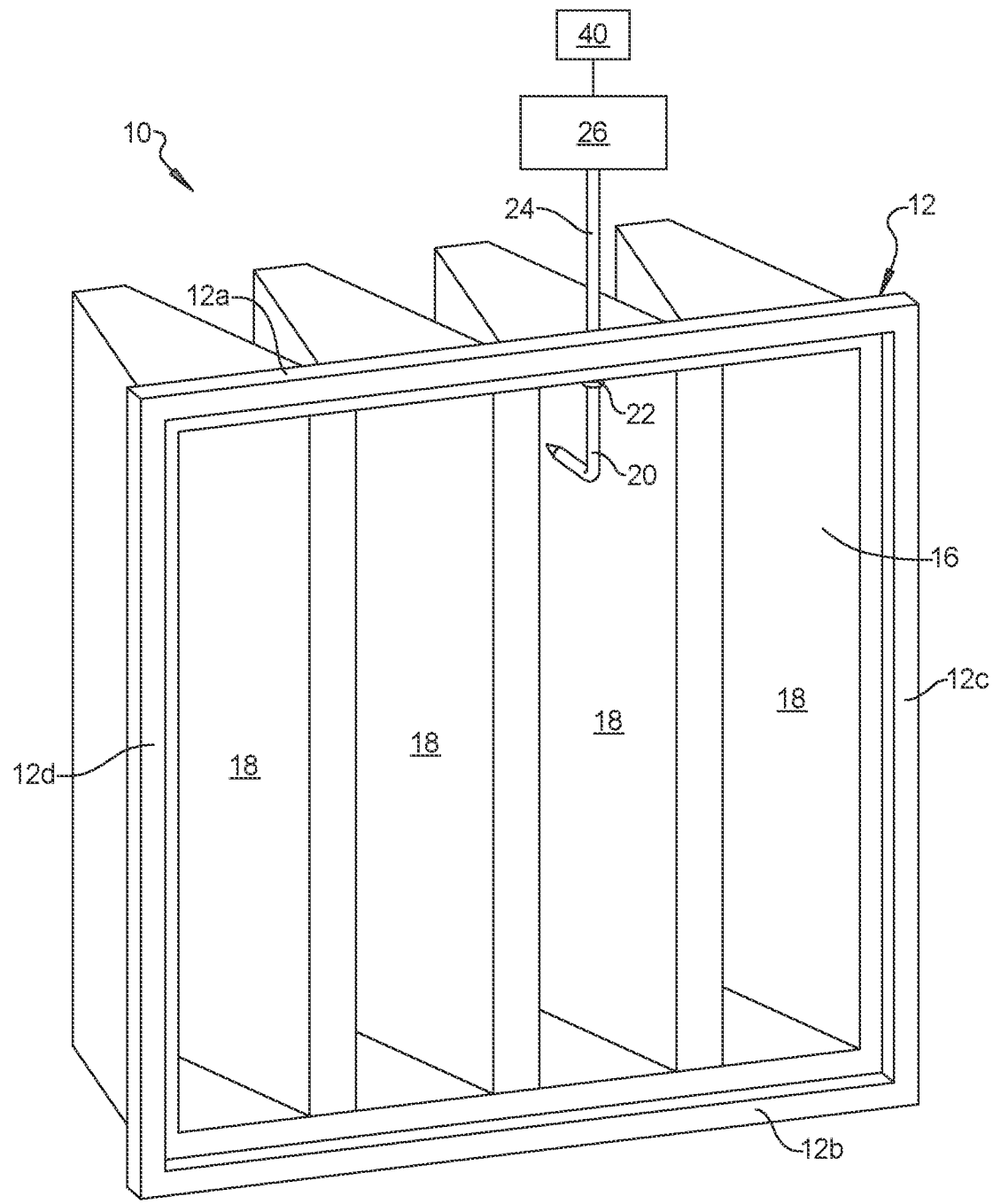
FIG. 3 is a front plan view of a filter assembly having a static pressure tip according to the principles of the present disclosure.
Figure 4A:
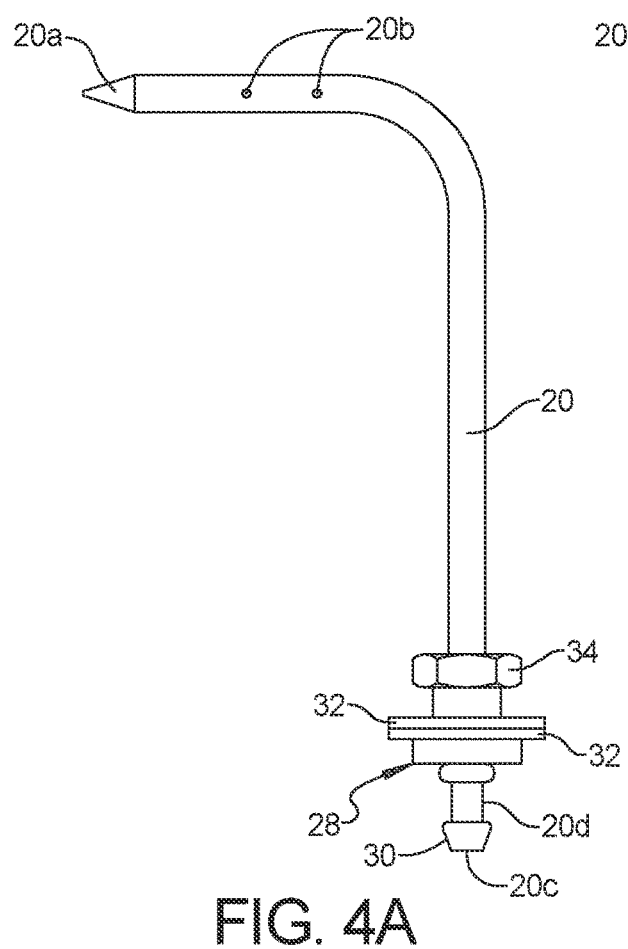
FIGS. 4a and 4b are perspective views of example static pressure tips according to the principles of the present disclosure.
Figure 4B:
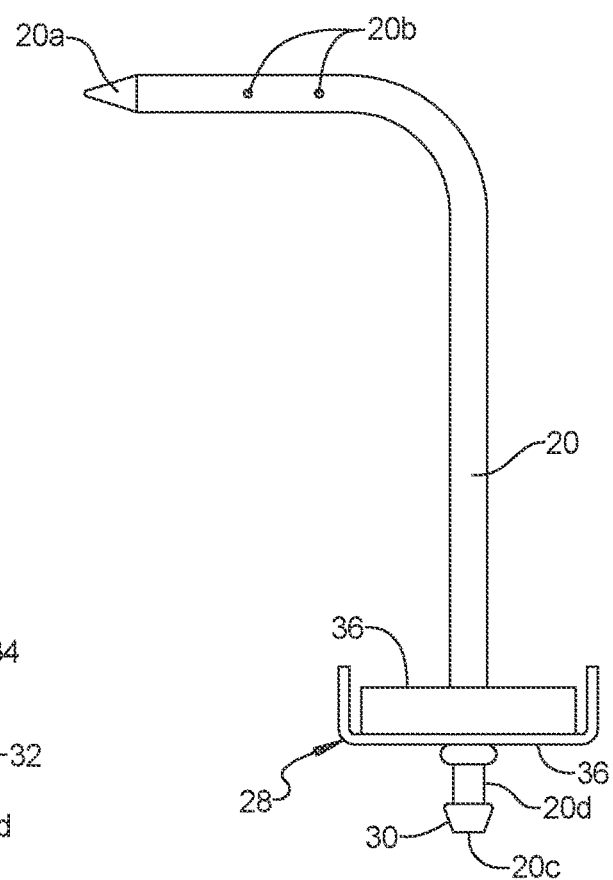

A static pressure tip 20 is shown mounted to two alternative location within an aperture 22 formed in the frame structure 12. The aperture 22 can be formed in an upper, lower or side wall 12a-12d of the frame structure 12. Alternatively, the aperture 22 can be formed in a cross bar 14 of the frame structure 12. As shown in FIGS. 4a, 4b the static pressure tip 20 can include an L-shaped probe that includes a distal end with a pointed tip 20a that is directed in an upstream direction of the airflow that comes through the filer media 16 and extends into a V-bank or pocket 18. The probe includes a pair of openings 20b that open in a lateral direction relative to the upstream direction and are in communication with an interior bore 20c that extends to a proximal end 20d of the probe 20. As shown in FIG. 2, the proximal end 20d of the probe is connected to a tube 24 that is connected to a differential pressure gauge (or measuring device) 26 such as, but not limited to a manometer. The static pressure tip 20 can have a mounting clamp 28 for mounting the static pressure tip 20 within the aperture 22 of the frame structure 12. As shown in FIG. 4a, the mounting clamp 28 can include a threaded base 30 that receives washers 32 and a nut 34 that can clamp against the frame structure 12. As shown in FIG. 4b, alternative clamp devices can also be used including, but not limited to, clamp plates 36 that can be press fit or otherwise secured to the proximal end of the static pressure tip 20. As shown in FIG. 2, the tube 24 can include a fitting 42 extending through an aperture in the filter medium 16 or frame structure 20 for directing the tube 24 to an exterior of the filter assembly 10.

In use, the static pressure tip 20 can be used to detect a pressure difference across a filter by comparing a measured pressure downstream of a filter to a measured pressure upstream of a filter detected by a sensor (not shown). The pressure difference is associated with the normal pressure reduction caused by the filter media 16 and the additional amount of blockage by filtered debris that is gathered on the filter media 16. When the pressure difference reaches a predetermined level, a controller 40 can provide a warning signal that the filter assembly 10 needs to be changed or cleaned.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An air filter, comprising:
   a frame structure made from plastic;
   a filter media disposed in and supported directly by the frame structure and forming a plurality of pockets, wherein the frame structure includes a plurality of cross bars disposed between the plurality of pockets; and
   a static pressure tip including an L-shaped probe having at least one side aperture in communication with a center bore and the L-shaped probe being mounted directly through an aperture in the frame structure and extending upstream within one of the plurality of pockets and the static pressure tip being spaced from the filter media on a downstream side of the filter media.

2. The air filter according to claim 1, further comprising a pressure sensor connected to the L-shaped probe via an elongated tube.

3. The air filter according to claim 1, wherein the static pressure tip is mounted to one of the plurality of cross bars.

4. An air filter, comprising:
   a frame structure made from plastic;
   a filter media disposed in and supported directly by the frame structure and forming a plurality of pockets, wherein the frame structure includes a plurality of cross bars disposed between the plurality of pockets; and
   a L-shaped probe mounted directly through an aperture in the frame structure to extend upstream within one of the plurality of pockets and having at least one side aperture in communication with a center bore, the L-shaped probe being connected to a pressure sensor via an elongated tube, wherein the L-shaped probe is spaced from the filter media on a downstream side of the filter media.

5. The air filter according to claim 4, wherein a static pressure tip is mounted to one of the plurality of cross bars.

6. An air filter, comprising:
   a frame structure made from plastic;

a filter media disposed in and supported directly by the frame structure and forming a plurality of pockets, wherein the frame structure includes a plurality of cross bars disposed between the plurality of pockets; and an L-shaped probe having at least one side aperture in communication with a center bore and the L-shaped probe being mounted upstream within one of the plurality of pockets, wherein the L-shaped probe is mounted through an aperture in one of the plurality of cross bars of the frame structure, wherein the L-shaped probe is spaced from the filter media on a downstream side of the filter media.

7. The air filter according to claim 6, further comprising a pressure sensor connected to the L-shaped probe via an elongated tube.

* * * * *